A. L. FLEURY.
Electric Machine.
No. 79,819.
Patented July 14, 1868.
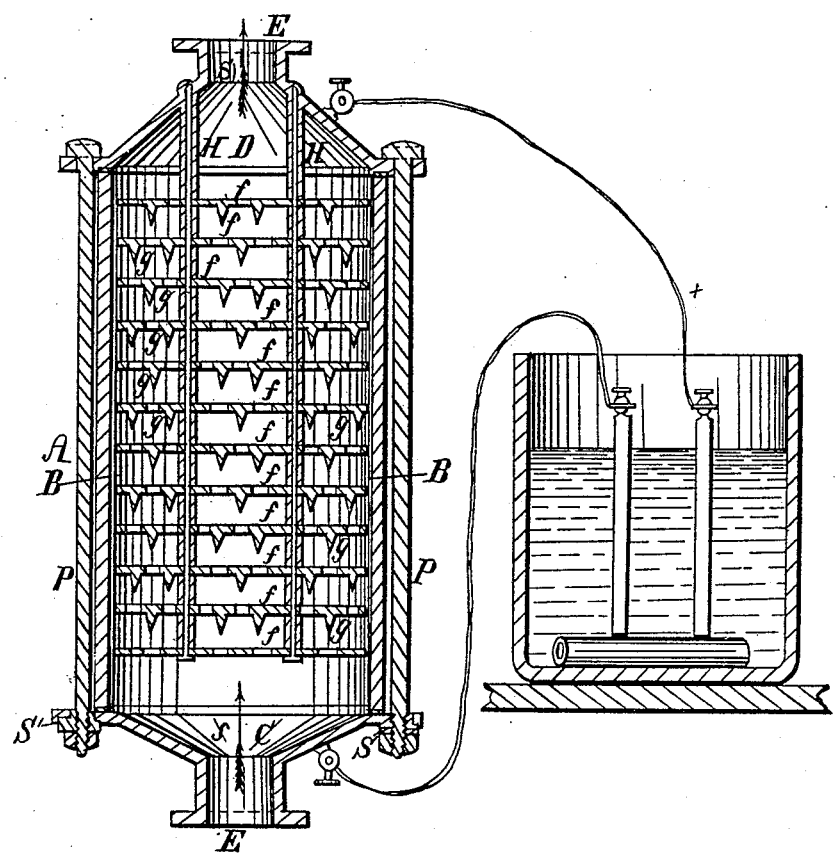
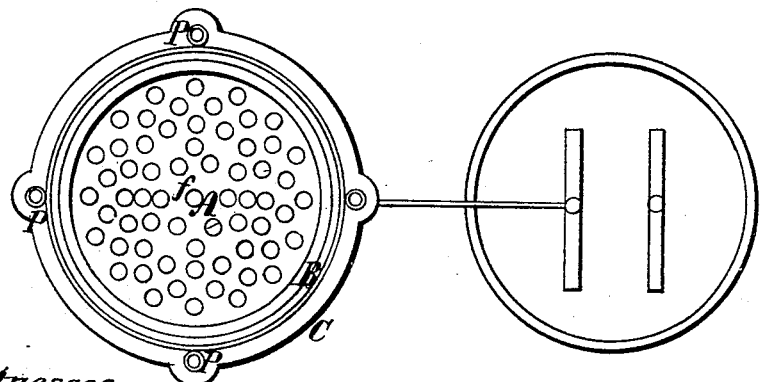
Witnesses:
Inventor:

United States Patent Office.

A. L. FLEURY, OF NEW YORK, N. Y.

Letters Patent No. 79,819, dated July 14, 1868.

IMPROVEMENT IN ELECTRIC MACHINES.

The Schedule referred to in these Letters Patent and making part of the same.

TO ALL WHOM IT MAY CONCERN:

Be it known that I, A. L. FLEURY, of the city, county, and State of New York, have invented certain Improvements in Electric Machines; and I do hereby declare that the following is a full and exact description of the same.

My invention consists in the construction and use of an apparatus in which latent heat of steam is converted into electricity, which can be used for any purpose in the arts and sciences, where any other electric machines, electrophorus, batteries, or electro, or magneto-electric machines are used or may be used hereafter.

My electric machine is fully illustrated in my annexed drawing, where I have represented it in sectional elevation through its centre, with a reaction-cup, where the two poles, + positive, and — negative, are brought together for obtaining a chemical reaction, such as galvano-plastic.

Description.

A is a capacity or chamber, the sides of which are made of a non-conductor of electricity, and the two ends of which, C and D, are made of metal. The bolts P P, which unite together the ends C and D, are insulated by non-conducting washers, S S, so that there is no electric communication between the ends D and C, and the apparatus is further insulated from any other part of the apparatus to which it is attached by the two washers E E, made of a non-conducting substance.

$ffff$ are a number of metallic plates, perforated, and having collecting points, $g\ g\ g$, to their under side. These plates $ff$ are kept apart and connected together by good conducting-rods or tubes, H H, and the points and holes are so arranged that the points of one plate will correspond with the holes of the plate below it.

The apparatus is set up on or in any pipe where there is a current of steam or vapors, either the supply-pipe, escape-pipe, blow-off pipe, &c., of a steam-engine, or other apparatus, where steam or vapors are used, or steam or vapors may be made to pass through it for the sole purpose of obtaining electricity, and in that case the pipe may be connected with a separate boiler, still, or evaporating-apparatus.

The operation of my electric apparatus is easily understood. The current of steam or other vapors being allowed to travel in the direction of the arrows S S, the steam or vapors will, by rushing upward through the holes in the plates, impinge on the points $g\ g\ g$. The particles of water resulting from a partial condensation of the steam will drop down and collect on the points where the friction, resulting from the rushing of the steam or vapor in opposite directions against the said particles of water, develops electricity, which is collected by the points $g\ g\ g\ g$, and conveyed by proper conductors where its effect is desired.

In using steam, the whole battery of plates and the end D will be charged with positive electricity, (+,) and the lower end of the capacity or plate C is charged with negative electricity, (—;) thus the plates D and C can be used as the two poles of a galvanic battery or the two condensators of any ordinary electrical machine, enabling me to produce chemical actions with greater economy and speed than is obtained by the usual galvanic batteries or electric machines.

This machine enables me, also, to prevent sediments in steam-boilers and to produce chemical decompositions of refractory nature.

What I claim as my invention, and desire to secure by Letters Patent, is—

1. The above-described electric machine, composed of the non-conductor casing A, isolated plates C and D, and battery of plates $ffff$, &c., arranged substantially in the manner set forth.

2. The battery of plates $ffff$, with perforations and exciting points $g\ g\ g\ g$, connected together, or any other perforated plates, wire-cloth, or equivalent, when arranged together and operating in the manner and for the purposes specified.

A. L. FLEURY. [L. S.]

Witnesses:
 H. GENGEMBRE HUBERT,
 DUDLEY R. P. WILCOX.